Sept. 2, 1969  A. L. SCHILLING  3,465,250

SPLIT CORE DIRECT CURRENT MEASURING DEVICE

Filed Sept. 14, 1967

INVENTOR.
ARDEN L. SCHILLING
BY
Drummond & Cahill
ATTORNEYS

United States Patent Office 3,465,250
Patented Sept. 2, 1969

3,465,250
SPLIT CORE DIRECT CURRENT MEASURING DEVICE
Arden L. Schilling, 2857 W. Palmetto,
Tucson, Ariz. 85705
Filed Sept. 14, 1967, Ser. No. 667,807
Int. Cl. G01r 33/02
U.S. Cl. 324—127                                      1 Claim

ABSTRACT OF THE DISCLOSURE

A split core device openable for receiving a conductor carrying a direct current. A movable portion is provided as part of the magnetic circuit of the core and is oscillatory between two positions to vary the reluctance of the magnetic circuit. The magnetic flux induced in the core by the direct current is thus measured by varying the flux as a result of varying the reluctance.

---

The present invention relates to devices for measuring DC current, and more specifically, a device for measuring the direct current being carried by a conductor without physically contacting the conductor.

The utilization of split core meters, sometimes referred to as "hook-on" meters, is well known in the art. Such prior art meters are predicated on the existence of an alternating current in a conductor. The alternating current provides a fluctuating magnetic field surrounding the conductor which may be sensed by placing a core around the conductor to provide a low reluctance flux path. A coil wound about the core is used to sense the flux changes occurring in the core and to thereby develop a measurable current in response thereto. This current may then be applied to a conventional alternating current meter to provide an indication of the current. The constants of the circuits are all readily derivable and the meter may be calibrated to provide a direct reading of the current being carried by the conductor. The prior art hook-on type meters are, as indicated previously, predicated on the existence of an alternating current. When a conductor carries a direct current, the magnetic field surrounding the conductor is constant. Thus, there are no flux changes to be induced in a core and to ultimately be sensed by a coil.

It is therefore an object of the present invention to provide a split core device for measuring the direct current being carried by a conductor.

It is another object of the present invention to provide a device for measuring the direct current being carried by a conductor with the utilization of an ammeter that is capable of measuring AC or DC to thereby render the device usable for measuring either AC or DC current.

It is still another object of the present invention to provide a device for measuring direct current being carried by a conductor through the utilization of simple, compact and reliable elements.

These and other objects of the present invention will become apparent to those skilled in the art as the description thereof proceeds.

Briefly, in accordance with the embodiment chosen for illustration, a split core is provided having a hingeable portion that may be hinged out of the way to admit a conductor carrying direct current. The core includes a second movable portion that may also be hinged independently of the previously mentioned hingeable portion and which is oscillatable between a low reluctance and a high reluctance position relative to the core. The oscillation of the second movable portion varies the magnetic reluctance of the circuit of the core such that any flux in the core will be varied, thus enabling a coil wound on the core to sense flux changes. Since the flux existing in the core is proportional to the current being carried by the conductor passing through the core, the magnitude of the current is derived by varying the reluctance of the magnetic circuit in a known manner.

The present invention may more readily be described by reference to the accompanying drawings, in which.

Figure 1:
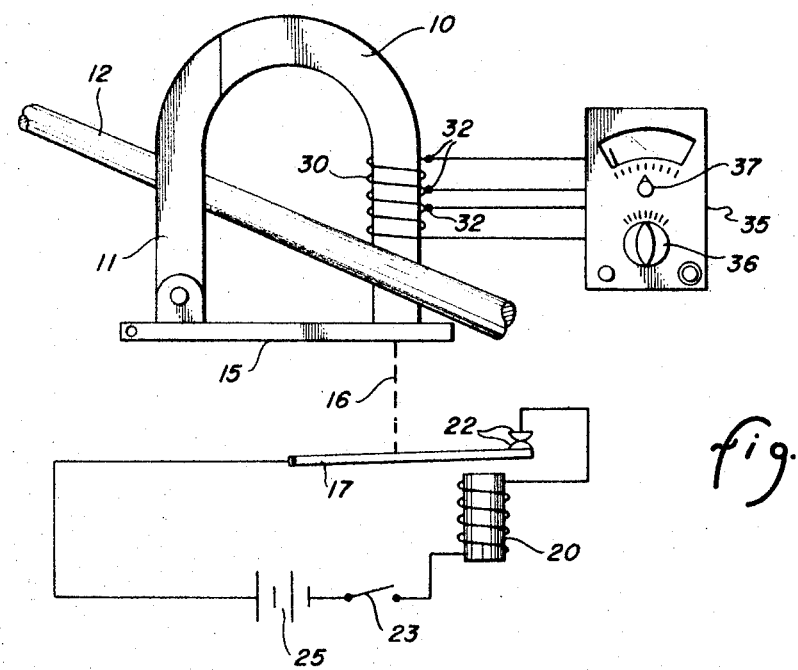
FIGURE 1 is a schematic drawing of a device constructed in accordance with the teachings of the present invention.
Figure 2:
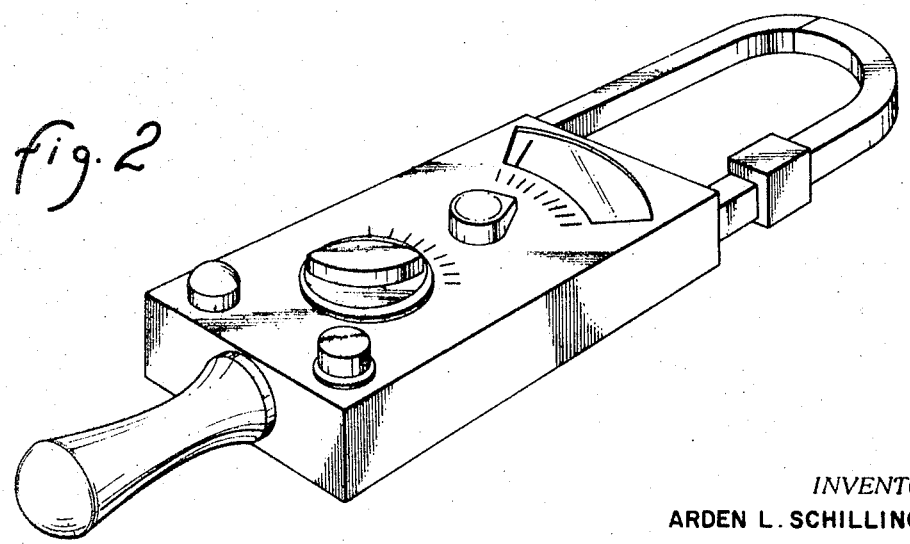
FIGURE 2 is a pictorial representation of a meter incorporating the features of FIGURE 1.

Referring now to the drawings, it may be seen that a split core 10 is provided with a hinged portion 11 to permit the core to be opened to admit a direct current carrying conductor 12. The split core also includes a movable portion 15. The movable portion 15 is connected by a mechanical connection indicated in FIGURE 1 at 16 to a solenoid armature 17. The armature 17 is oscillatable between two positions, one of which is shown in FIGURE 1 and the other of which is directly against the solenoid 20. In the former position, the contacts 22 are closed as shown in FIGURE 1, and in the second position the contacts 22 are opened. The solenoid 20 is connected in an electrical circuit which includes an on-off switch 23, and a battery 25. The circuit is completed through the solenoid armature and the contacts 22.

The split core 10 is provided with a coil 30 wound thereabout for sensing changes in flux in the core. The coil 30 is provided with a plurality of taps 32 to permit selection of appropriate ranges of sensitivity. The coil 30 through the taps 32 is connected to an ammeter 35. The ammeter 35 may be utilized to measure a variety of functions in accordance with the conventional practice of using a meter to provide a variety of measurements. For example, the meter 35 may have a variety of inputs and the selection of which is provided by a selector dial 36. Also, the range of values to be measured by the meter is determined by a range switch 37.

It will be obvious to those skilled in the art that the split core arrangement shown in FIGURE 1 may readily be utilized to measure alternating currents in the conventional fashion by merely leaving the on-off switch 23 in the open position. Since most currents being measured in this manner will be alternating at a nominal 60 cycles per second, and since the measurement of current in this manner may be frequency sensitive, it would be advantageous to design the solenoid 20 to operate at a nominal frequency of 60 cycles per second. In this manner, the variation of the flux in the split core when measuring a direct current will approximate the frequency of alternation when measuring an alternating current. It has been found that the solenoid 20, solenoid armature 17 and contacts 22 may conveniently be a "buzzer" type structure provided, of course, that the addition of the mass of the movable portion 15 to the oscillating armature 17 does not overly damp the oscillations thereof. Such "buzzer" type structures may be frequency-adjusted varying the stationary contact point.

The operation of the device of FIGURE 1 may now be described. The hinged portion 11 is swung counterclockwise to admit the direct current carrying conductor 12 and then closed in a clockwise manner to thereby close the core and provide a single continuous low-reluctance flux path. The current being carried in the conductor 12 sets up a field which is cut by the core 10. The on-off switch 23 may then be closed, causing the solenoid armature 17 to be drawn to the solenoid 20; however, the instant the armature 17 moves toward the solenoid 20, the contacts 22 are opened and the solenoid armature 17 then returns to its original position. This operation is repeated at the frequency indicated above and continues oscillating in this manner while the on-off switch 23 remains closed. The oscillatory motion of the armature 17 is imparted to the movable portion 15 of the split core through the mechanical connection 16. When the movable portion 15 is in the position shown in FIGURE 1, a minimum magnetic reluctance is provided to the magnetic circuit comprising the core; however, when the solenoid armature is attracted to the solenoid 20 thus causing the movable portion 15 to swing downwardly and away from the open ends of the U-shaped core, the magnetic reluctance of the core immediately increases significantly. An increased reluctance in the core reduces the flux therein only to be again increased when the movable portion is returned to its original position. Thus, the uniform flux provided by the current in the conductor 12 is varied by varying the magnetic reluctance of the split core. This varying flux is sensed by the coil 30 in which a current is induced and is provided to the ammeter 35. It may be seen that the elements of the present system may readily be calibrated so that the ammeter indication is a direct indication of the current being carried by the conductor 12 even though the current is a direct current with a non-varying magnetic field.

It will be obvious to those skilled in the art that many modifications may be made in the various elements and arrangements of the present invention without departing from the spirit and scope thereof.

What is claimed is:

1. Means for measuring direct current being carried by a conductor comprising: a core having a pair of hinged portions, the first of which opens to admit said conductor and the second of which is oscillatable between an open and a closed position to provide a variable reluctance flux path; an oscillator solenoid connected to said second hinged portion to alternately open and close said second hinged portion; a stationary coil wound on a non-hinged portion of said core for sensing flux changes therein; and a meter connected to said coil for indicating current in said conductor.

References Cited

UNITED STATES PATENTS 2,345,430   3/1944   Rich _____ 324—127

RUDOLPH V. ROLINEC, Primary Examiner

A. E. SMITH, Assistant Examiner

U.S. Cl. X.R.

321—49